United States Patent
Ontiveros

(10) Patent No.: US 9,219,365 B2
(45) Date of Patent: Dec. 22, 2015

(54) CONTROLLER FOR REDUCING ELECTRICITY DEMAND SPIKES

(76) Inventor: Oscar E. Ontiveros, El Paso, TX (US)

( * ) Notice: Subject to any disclaimer, the term of this patent is extended or adjusted under 35 U.S.C. 154(b) by 331 days.

(21) Appl. No.: 13/183,309

(22) Filed: Jul. 14, 2011

(65) Prior Publication Data

US 2012/0053749 A1    Mar. 1, 2012

Related U.S. Application Data

(60) Provisional application No. 61/377,388, filed on Aug. 26, 2010.

(51) Int. Cl.
| | | |
|---|---|---|
| G05D 3/12 | (2006.01) | |
| G05D 5/00 | (2006.01) | |
| G05D 9/00 | (2006.01) | |
| G05D 11/00 | (2006.01) | |
| H02J 3/14 | (2006.01) | |
| H02J 1/14 | (2006.01) | |

(52) U.S. Cl.
CPC .... H02J 3/14 (2013.01); H02J 1/14 (2013.01)

(58) Field of Classification Search
CPC ............. G01R 31/362; H02J 3/14; H02J 1/14
USPC ................... 700/291, 295, 296, 297
See application file for complete search history.

(56) References Cited

U.S. PATENT DOCUMENTS

| | | | | |
|---|---|---|---|---|
| 5,572,438 A | * | 11/1996 | Ehlers et al. | 700/295 |
| 5,715,154 A | * | 2/1998 | Rault | 363/89 |
| 6,119,469 A | * | 9/2000 | Elwood | 62/126 |
| 6,434,957 B1 | * | 8/2002 | Nishizuka et al. | 62/175 |
| 7,566,987 B2 | * | 7/2009 | Black et al. | 307/41 |
| 7,974,057 B2 | * | 7/2011 | Schiene et al. | 361/58 |
| 8,639,392 B2 | * | 1/2014 | Chassin | 700/291 |
| 2005/0210895 A1 | * | 9/2005 | Horton | 62/158 |
| 2009/0281885 A1 | * | 11/2009 | Castelli et al. | 705/14.13 |
| 2010/0004793 A1 | * | 1/2010 | Ohkuwa et al. | 700/295 |
| 2010/0218108 A1 | * | 8/2010 | Crabtree et al. | 715/738 |
| 2010/0274407 A1 | * | 10/2010 | Creed | 700/295 |
| 2010/0298988 A1 | * | 11/2010 | Stachler et al. | 700/276 |

FOREIGN PATENT DOCUMENTS

WO    WO0250477    *    6/2002

OTHER PUBLICATIONS

"What is a power (demand) charge?", http://web.archive.org/web/20100213101521/http://www.rockymountainpower.net/bus/ayu/uyec.html (2 pages) Feb. 13, 2010.
Reducing Demand Charges: Adjusting motor start-ups can help reduce demand charges; http://web.archive.org/ web/20100519205959/http://www.rockymountainpower.net/ya/yb/bec/uyec.html (1 page) May 19, 2010.
Advanced Energy Control (AEC); http://web.archive.org/web/20060109193219/http://www.advancedenergycontrol. com/services.cfm?serviceid=10 (2 pages) Jan. 9, 2006.
Rocky Mountain Power's Cool Keeper Program; http://web.archive.org/web/20091212235917/http://www.coolkeeper.net/about_home.php (3 pages) Dec. 12, 2009.

* cited by examiner

*Primary Examiner* — Mohammad Ali
*Assistant Examiner* — Ziaul Karim
(74) *Attorney, Agent, or Firm* — Workman Nydegger

(57) ABSTRACT

Embodiments are directed to systems and methods for controlling the start-up sequence of two or more electrical devices. An electronic controller intercepts a plurality of initiation signals configured to start a plurality of electrical devices. The controller then implements a delay between the initiation signals so as to avoid demand spike surcharges.

14 Claims, 5 Drawing Sheets

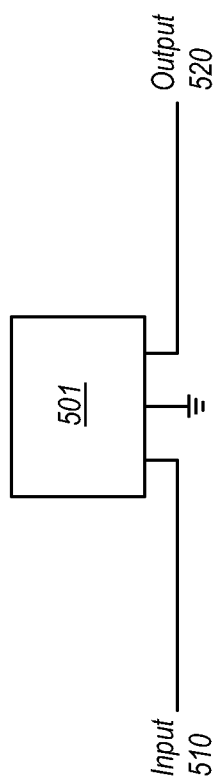

CONTROLLER FOR REDUCING ELECTRICITY DEMAND SPIKES

CROSS-REFERENCE TO RELATED APPLICATIONS

This application claims priority to and the benefit of U.S. Provisional Application No. 61/377,388, entitled "Controller for Reducing Electricity Demand Spikes", which was filed on Aug. 26, 2010, and which is incorporated by reference in its entirety herein.

BACKGROUND

Electric devices have been commonplace for many years. They are used in nearly every facet of modern lives. Electric devices may be used alone or in combination with other devices. In some cases, large groups of electric devices may be used in conjunction to produce a desired result. For example, multiple lights may be used to light a building, multiple electric doors may be used to regulate entry into a building, or multiple air conditioners may be used to control air temperature in a building.

In some cases, electric devices may be designed for manual initiation, or in other cases, may be designed for automatic or electronic initiation. For example, dishwashers are typically designed for manual initiation by the user, while refrigerators are typically designed for automatic initiation upon receiving a request from an internal thermostat. In the case of the refrigerator, the internal thermostat indicates to the refrigerator that it is to begin operation when the thermostat has reached a certain temperature (i.e. when the internal air temperature inside the refrigerator is too warm).

Typically, when electric devices receive a command to initiate operation, the command is heeded immediately, without question. When larger electric devices turn on, an electricity demand spike is created. In cases where multiple large electric devices are turned on, the demand spikes cumulate and can become quite severe.

BRIEF SUMMARY

Embodiments described herein are directed to systems and methods for controlling the start-up sequence of two or more electrical devices, where each electrical device is activated by an initiation signal. A controller is placed so that it intercepts the initiation signals of the electrical devices before the signals can activate the devices. If the controller intercepts the initiation signals for two or more devices within a threshold time period, it implements a delay between the initiation signals so that the devices are activated in a staggered fashion. In some cases, the delay introduced works to avoid the cumulative electrical demand spike generated when two or more electrical devices are activated within the threshold time period.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which:

FIG. 5 illustrates a micro-controller with input and output leads.

DETAILED DESCRIPTION

Embodiments described herein are directed to systems and methods for controlling the start-up sequence of two or more electrical devices, where each electrical device is activated by an initiation signal. A controller is placed so that it intercepts the initiation signals of the electrical devices before the signals can activate the devices. If the controller intercepts the initiation signals for two or more devices within a threshold time period, it implements a delay between the initiation signals so that the devices are activated in a staggered fashion. In some cases, the delay introduced works to avoid the cumulative electrical demand spike generated when two or more electrical devices are activated within the threshold time period.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

As used herein, the term "Initiation Signal" refers to a signal sent to start an electronic or electric device; or, if a controller is present, the signal that was meant to start an electronic or electric device but was intercepted by the controller. The term "Activation Signal" refers to a signal sent from a controller to start an electronic or electric device. The activation signal may also be referred to as the passed initiation signal. The term "Delay Period" refers to the set or determined time period introduced between the activation of electronic or electric devices so that the cumulative demand spike created by the devices starting near the same time is mitigated. The term "Threshold Time Period" refers to the time period before, and within the delay period after, the last initiated activation signal.

Figure 1:
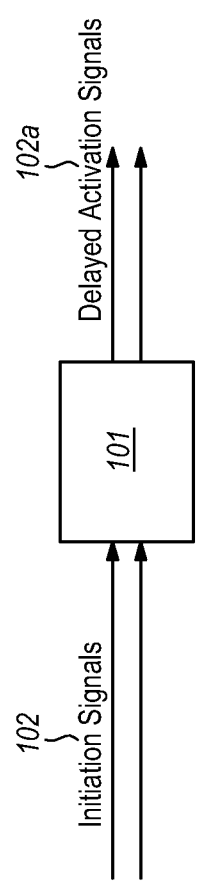
FIG. 1 illustrates a controller receiving initiation signals as inputs, and as outputs producing delayed activation signals.

FIG. 1 illustrates a controller 101 intercepting initiation signals 102 and then producing delayed activation signals 102a. By intercepting the initiation signals before the initiation signals start the respective devices, the controller can implement a delay between the activation signals so that devices controlled by the controller do not create a cumulative electrical demand spike.

Figure 2:
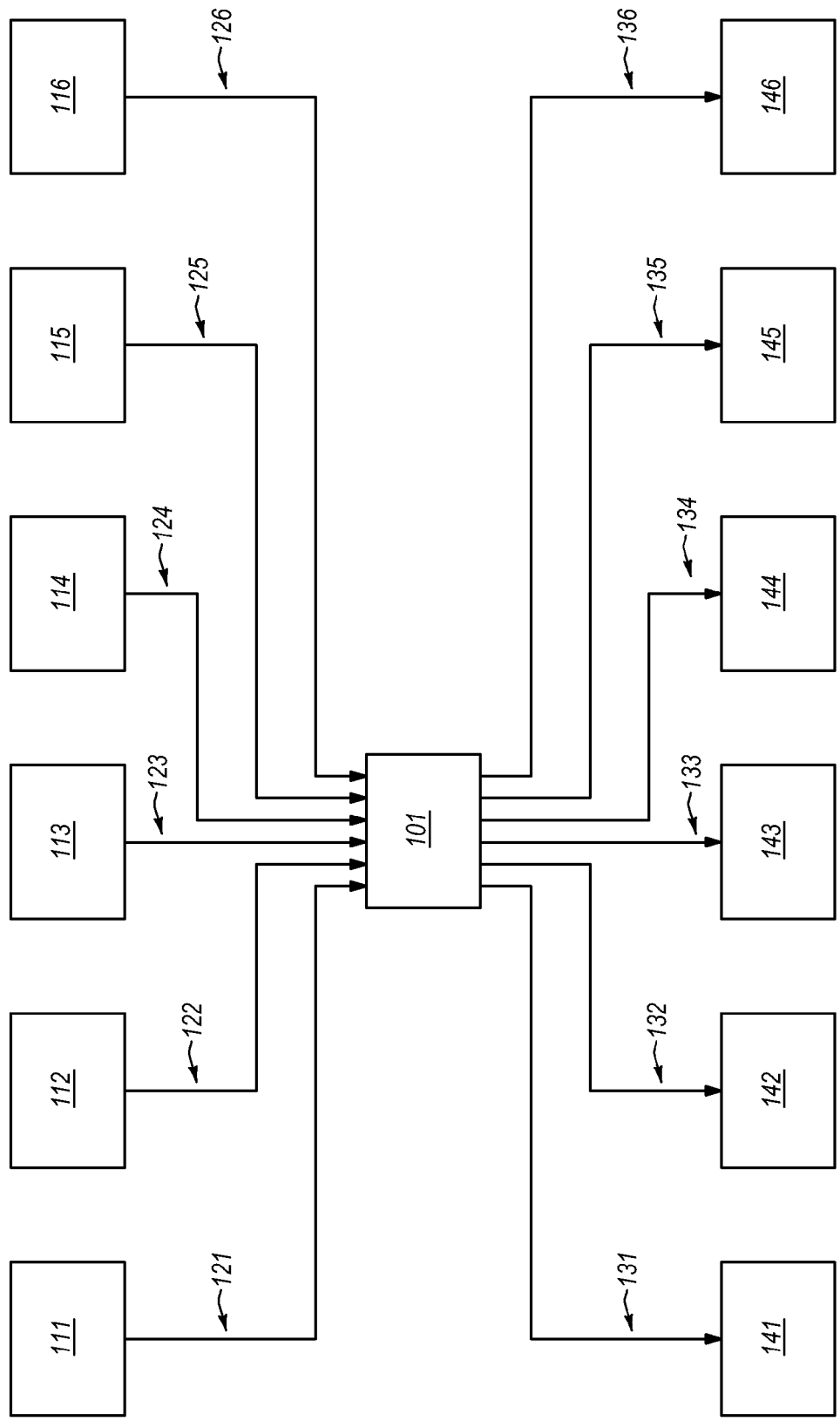
FIG. 2 illustrates an example of a controller placed to control the start-up of six electrical devices units.

FIG. 2 illustrates an example of a controller 101 used to manipulate the activation times of six electrical devices. In this example, the devices are air conditioning units. The first air conditioning unit has a thermostat 111 and a corresponding motor 141. When the thermostat 111 reads a temperature greater than a set temperature, it sends an initiation signal 121 to start the motor 141. However, the controller 101 intercepts the initiation signal 121 before it reaches the motor 141. At the appropriate time, the controller 101 sends an activation signal 131 to start the first air conditioning unit's motor 141. Likewise, the other five air conditioning units each have a thermostat 112-116, corresponding motor 142-146, and corresponding initiation 122-126 and activation 132-136 signals.

In some cases, upon intercepting a first initiation signal, the controller sends an activation signal to the corresponding motor. However, if the controller receives a second initiation signal within a threshold time period of the first signal, the controller will wait to send out a corresponding second activation signal until a predetermined time period after the controller sent out the first activation signal. If the controller receives a third initiation signal within the threshold time period of when the second activation signal was scheduled to occur, the controller will wait to send out the third activation signal for a predetermined delay time after the second activation signal, and so on.

While in this example, only one air conditioning unit motor is turned on at a time, it is noted that the controller could turn on any number of motors at the same time. In some applications, a user could start several devices at the same time because the cumulative demand spike would not exceed a peak usage threshold (e.g., a limit where the user would have to pay the utility company a higher fee). For example, a large industrial complex having many air conditioning units (or, perhaps, other smaller electrical devices) may be able to turn on two or three at a time without exceeding its peak usage threshold.

Figure 3:
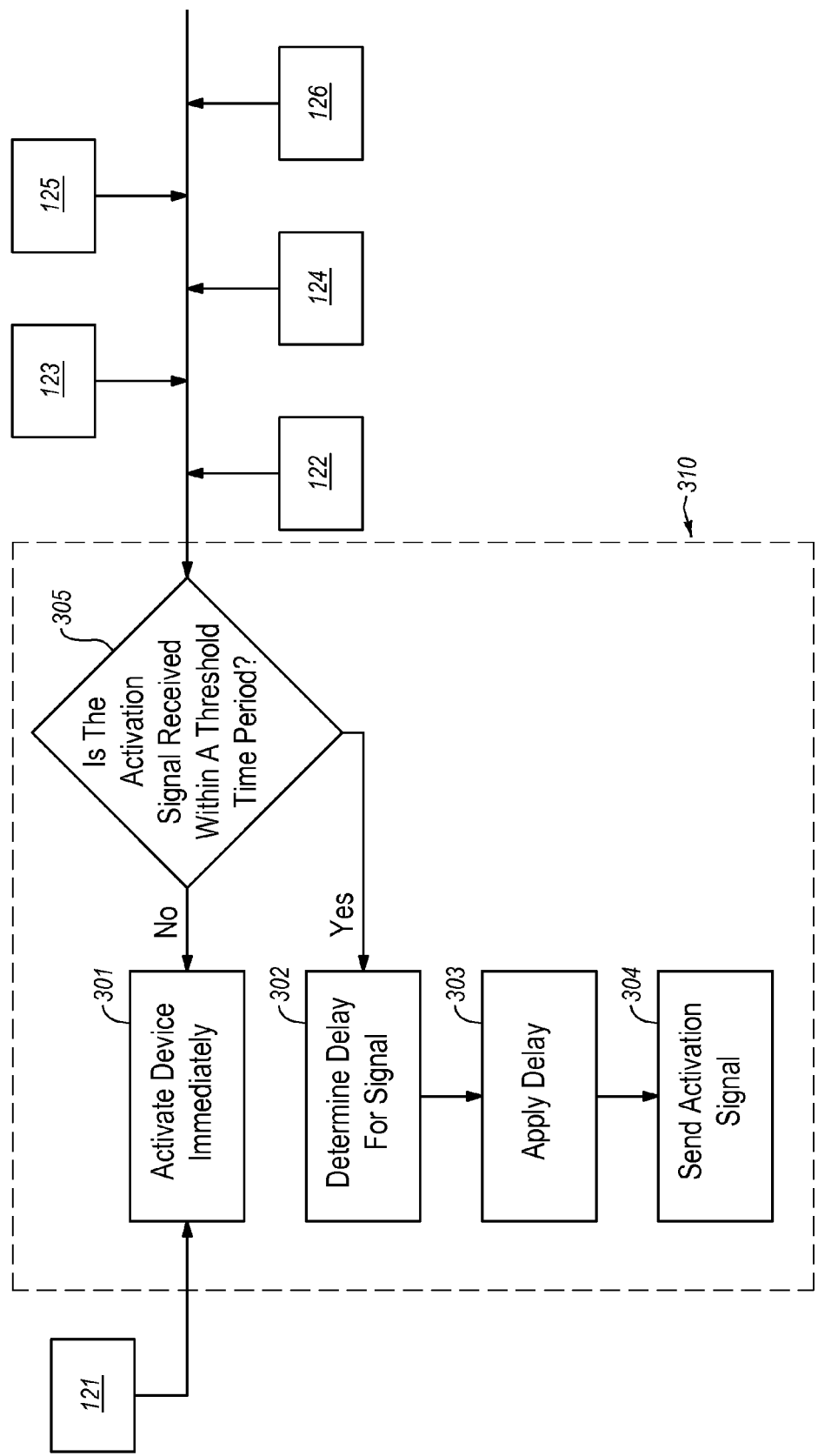
FIG. 3 illustrates a flow chart of a controller receiving several initiation signals.

FIG. 3 illustrates a flowchart 310 of the logic used by the controller in FIG. 2. When the controller receives a first initiation signal 121, the controller 101 activates the corresponding motor substantially immediately (act 301). When the controller receives a second initiation signal 122, the controller determines if the second signal is received within a threshold time period (act 305). If the second signal was not received within the threshold time period, the second device is activated substantially immediately (act 301). However, if the second signal is received within the threshold time period, the controller first determines how long to delay the signal (act 302), applies the delay (act 303), and then sends an activation signal at the appropriate time (act 304). The controller may then receive a third initiation signal 123, and so on.

While in the above example the first initiation signal is passed substantially immediately, in another embodiment, the controller could introduce a delay after receiving the first initiation signal. As discussed further below, an example application may include restarting several electrical devices after a power outage where certain devices have start priority over others. In this manner, if device two had start priority over device one, device two could be started before device one even though the first initiation signal was received before the second initiation signal.

Figure 4:
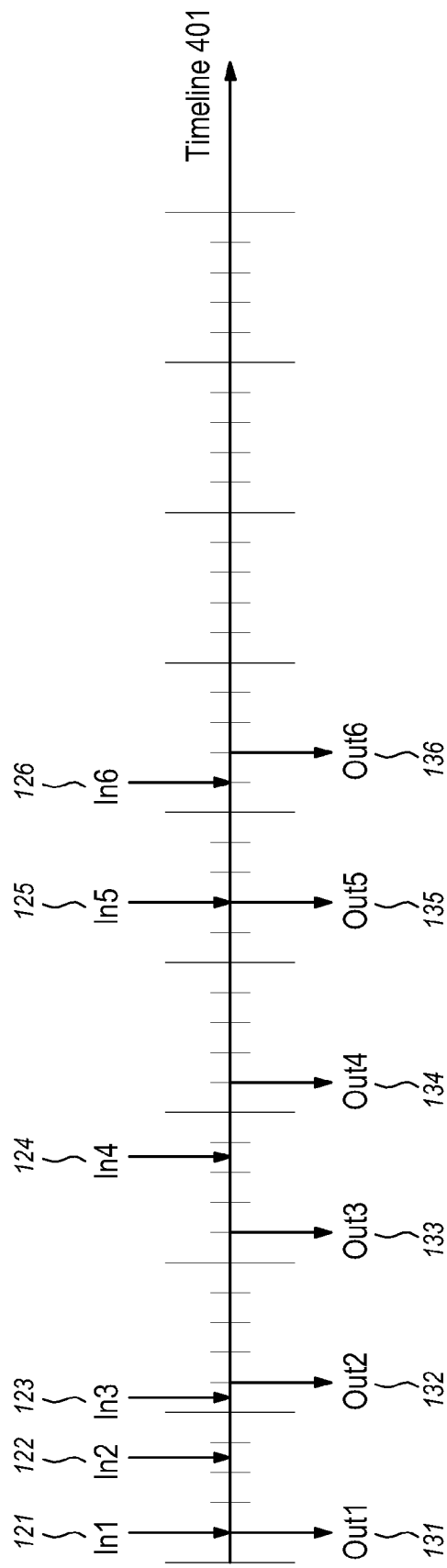
FIG. 4 illustrates a temporal example of the controller receiving several initiation signals and producing corresponding activation signals.

FIG. 4 illustrates a temporal example of the controller activating the six air conditioning units of FIG. 2 under the presumption of a predetermined delay period of, for example, five seconds (i.e. the controller is only to allow one motor to start within a five second time period). The top part of the timeline 401 represents the time at which the controller receives an initiation signal from an air conditioning thermostat. The bottom part of the scale represents when the controller sends an activation signal to start the corresponding air conditioning unit's motor.

At t=1, the controller intercepts a first initiation signal 121. Because it is the first signal received, the controller sends the first activation signal 131 to start the corresponding motor at t=1. At t=3.5, the controller receives a second initiation signal 122. Because the controller receives the second initiation signal within the threshold time period (i.e. in this case within five seconds after the first activation signal 131), the controller delays sending out the second activation signal 132 until t=6 (i.e. five seconds after the first activation signal 131). At t=5.5, the controller receives a third initiation signal 123. Because the controller receives the third initiation signal within the threshold time period (i.e. in this case prior to the scheduled activation of the second activation signal at t=6), the controller delays sending out the third activation signal 133 until t=11 (i.e. five seconds after the second activation signal). This continues until all the air conditioning units have been turned on. Because only one air conditioning unit was turned on at a time, a cumulative demand spike made from multiple units turning on within a five second time period is avoided.

It should be noted that while air conditioning units have been used in the examples above, substantially any electric device may be controlled or monitored. Additionally, the delay period can be changed based on the device type and energy demand. For high demand devices or devices that take longer to start, the delay may be longer; for lower demand devices or for devices that start quickly, the delay may be shorter. The delay period for a particular device could be set based on the start-up characteristics of a similar type of electrical device; or, the delay period could be set based on the start-up characteristics of that particular device.

Further, the delay period does not need to be the same for each device controlled by the controller (e.g., a 10 second delay is implemented after device A, a 15 second delay is implemented after device B, etc.). Thus, the controller may determine which device the initiation signal was received from and implement a delay specifically tailored to that device. As such, the tailored delay period may be customized (e.g. in length) to avoid demand spike surcharges in a particular area or changed in relation to a utility company's change in fee structure. For example, if a utility company has a lower demand spike threshold during the day, but a higher demand spike threshold during the night, the controller could adjust delay periods accordingly depending on the time of day. The delay times may be continually updated, either manually by a user or automatically (e.g. over the internet).

FIG. 5 illustrates a micro-controller 501. A micro-controller controls one device (or a plurality of coupled devices) by receiving an initiation signal by an input lead 510 and sends an activation signal by an output lead 520. The micro-controller is also linked to the controller's processor (not shown).

Many other variations may also be used. For example, the delay period could be determined by a delay module where the delay module is programmed by the manufacturer. Alternately or in conjunction with the factory set delay period module, there could be a delay module where the user could select the desired delay period. The user could enter the desired delay period using a dial, switch, buttons, keypad, computer interface, etc. This delay period could apply to all the devices, or the user could set a different delay period for each individual device or each type of device.

Another alternative feature is that the controller could comprise a plurality of micro-controllers (see FIG. 5). In one embodiment, the controller comprises micro-controller boards, each micro-controller board having eight microcontrollers. The micro-controller boards have jumpers so that micro-controller boards can be added, in a modular fashion, to the controller to expand the number of devices the controller can control. In some cases, each expander micro-controller board may service up to eight units. As such, one, two, three, or up to eight expander micro-controller boards may be used, which enables the controller to control up to 8, 16, 24, 32, 40, 48, 56 or 64 devices respectively. Additionally, some of the micro-controller boards may have precedence over others. For example, if there are certain devices that have start priority over others, such as cooling units for server rooms, those devices can be connected to the micro-controllers on the first micro-controller board, where devices on the first controller board have priority over the others. A circumstance where this may be useful is when starting several devices after a power-outage so that the high-priority devices are started sooner.

The controller can have a memory module that stores the sequence and/or the time in which the controller intercepts the initiation signals. In one embodiment, a processor samples each of the micro-controllers every half-second and records the time when it receives an initiation signal. The controller could then send activation signals in the same sequence as the initiation signals, or, as discussed above, could give priority to certain devices. The controller can also be located on the same property as the electrical devices and connected using wires, or control the devices remotely by wireless transmission.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. An electronic controller including a memory module and at least one processor for controlling a start-up sequence of two or more electrical devices, wherein the electronic controller is configured to perform the following:
    intercepting at the electronic controller a group of two or more externally generated initiation signals configured to initiate two or more different electrical devices;
    storing the group of two or more externally generated initiation signals in the memory module in sequence as they are received;
    prioritizing the sequence of initiation signals stored in the memory module such that initiation signals associated with electrical devices with higher priority are scheduled to be passed to their respective electrical devices before the initiation signals associated with lower-priority electrical devices;
    determining an electricity demand value for each of the two or more different electrical devices, where the electricity demand value comprises the amount of electricity required to simultaneously initiate each of the two or more different electrical devices;
    determining a usage threshold, the usage threshold specifying an electricity usage limit beyond which additional cumulative demand electricity fees will apply regardless of the time of day at which the usage threshold is exceeded, the cumulative demand electricity fees comprising fees charged for stacked spikes in electricity demand that exceed the usage threshold;
    upon determining that the cumulative electricity demand values from the two or more different electrical devices is determined to be less than the usage threshold, passing initiation signals to the two or more different electrical devices based on the prioritized sequence of initiation signals;
    implementing one or more delays in passing initiation signals that would cause the usage threshold to be exceeded, such that the remaining initiation signals within the prioritized sequence of initiation signals are passed to the associated electrical devices after the implemented one or more delays, wherein the implemented one or more delays are calculated, based on the electricity demand values associated with each electrical device, to be long enough to avoid surpassing the usage threshold due to multiple stacked electricity demand spikes and thereby avoid cumulative demand spike fees; and
    passing the group of two or more externally generated initiation signals that do not exceed the usage threshold to the associated two or more different electrical devices without delay.

2. The electronic controller of claim 1, further comprising a delay preset module, wherein the delay preset module delays any subsequent initiation signals such that only a set number of devices are activated within a preset delay period.

3. The electronic controller of claim 2, wherein the preset delay period of the delay preset module is user-adjustable.

4. The electronic controller of claim 2, wherein the preset delay period of the delay preset module is set by the manufacturer of the electronic controller.

5. The electronic controller of claim 2, wherein the length of the preset delay period for a selected electrical device is based on one or more characteristics corresponding to that type of electrical device.

6. The electronic controller of claim 2, where the length of the preset delay period for a selected electrical device is set based on one or more characteristics of the selected electrical device.

7. The electronic controller of claim 1, further comprising:
    an act of determining a level at which spike surcharges apply for a given user; and
    based on that determination, further determining appropriate delay periods for the electrical devices such that the determined spike surcharge level is not exceeded.

8. The electronic controller of claim 1, further comprising a plurality of micro-controllers, each micro-controller comprising an input lead for receiving an initiation signal from an external initiation signal generating device, and an output lead to relay an activation signal.

9. The electronic controller of claim 8, further comprising a number of micro-controller boards, each micro-controller board comprising a plurality of micro-controllers, the micro-controller boards being modular with each other and adaptable to control a variable number of electrical devices.

10. A method for controlling a start-up sequence of electrical devices comprising:
    intercepting a group of two or more externally generated initiation signals configured to initiate two or more different electrical devices;

storing the group of two or more externally generated initiation signals in a memory module in sequence as they are received;

prioritizing the sequence of initiation signals stored in the memory module such that initiation signals associated with electrical devices with higher priority are scheduled to be passed to their respective electrical devices before the initiation signals associated with lower-priority electrical devices;

determining an electricity demand value for each of the two or more different electrical devices, where the electricity demand value comprises the amount of electricity required to simultaneously initiate each of the two or more different electrical devices;

determining a usage threshold, the usage threshold specifying an electricity usage limit beyond which additional cumulative demand electricity fees will apply regardless of the time of day at which the usage threshold is exceeded, the cumulative demand electricity fees comprising fees charged for stacked spikes in electricity demand that exceed the usage threshold;

upon determining that the cumulative electricity demand values from the two or more different electrical devices is determined to be less than the usage threshold, passing initiation signals to the two or more different electrical devices based on the prioritized sequence of;

implementing one or more delays in passing initiation signals that would cause the usage threshold to be exceeded, such that the remaining initiation signals within the prioritized sequence of initiation signals are passed to the associated electrical devices after the implemented one or more delays, wherein the implemented one or more delays are calculated, based on the electricity demand values associated with each electrical device, to be long enough to avoid surpassing the usage threshold due to multiple stacked electricity demand spikes and thereby avoid cumulative demand spike fees; and passing the group of two or more externally generated initiation signals that do not exceed the usage threshold to the associated two or more different electrical devices without delay.

11. The method of claim 10, further comprising:

an act of accessing a predetermined demand spike surcharge level;

an act of determining, based on the accessed demand spike surcharge level and based on the electrical device type for which the initiation signal is intended, an appropriate length delay period to implement between signals to avoid reaching the demand spike surcharge level; and an act of applying the determined delay between received initiation signals.

12. The method of claim 10, wherein a customized delay period is implemented for each initiation signal stored in the memory module.

13. The method of claim 12, wherein the customized delay period is based on at least one of the following: the electric device itself or an electricity load rating of electric device.

14. An electronic controller for controlling a start-up sequence of two or more electrical devices, the electronic controller comprising one or more modular micro-controller boards adaptable for controlling a variable number of electrical devices, and is configured to perform the following:

intercepting at the electronic controller a group of two or more externally generated initiation signals configured to initiate two or more different electrical devices;

storing the group of two or more intercepted initiation signals in a memory module in sequence as they are received;

prioritizing the sequence of initiation signals stored in the memory module such that initiation signals associated with electrical devices with higher priority are scheduled to be passed to their respective electrical devices before the initiation signals associated with lower-priority electrical devices;

determining an electricity demand value for each of the two or more different electrical devices, where the electricity demand value comprises the amount of electricity required to simultaneously initiate each of the two or more different electrical devices;

determining a usage threshold, the usage threshold specifying an electricity usage limit beyond which additional cumulative demand electricity fees will apply regardless of the time of day at which the usage threshold is exceeded, the cumulative demand electricity fees comprising fees charged for stacked spikes in electricity demand that exceed the usage threshold;

upon determining that the cumulative electricity demand values from the two or more different electrical devices is determined to be less than the usage threshold, passing initiation signals to the two or more different electrical devices based on the prioritized sequence of initiation signals;

implementing one or more delays in passing initiation signals that would cause the usage threshold to be exceeded, such that the initiation signals within the prioritized sequence of initiation signals are passed to the associated electrical devices after the implemented one or more delays, wherein the one or more delays are calculated, based on the electricity demand values associated with each electrical device, to be long enough to avoid surpassing the usage threshold due to multiple stacked electricity demand spikes and thereby avoid cumulative demand spike fees; and passing the group of two or more externally generated initiation signals that do not exceed the usage threshold to the associated two or more different electrical devices without delay.

\* \* \* \* \*